United States Patent
Yabu et al.

(10) Patent No.: US 8,722,812 B2
(45) Date of Patent: May 13, 2014

(54) METHOD FOR PRODUCING INORGANIC-ORGANIC HYBRID PARTICLE

(75) Inventors: Hiroshi Yabu, Miyagi (JP); Takeshi Higuchi, Fukuoka (JP); Kiwamu Motoyoshi, Tokyo (JP); Kazutaka Koike, Osaka (JP)

(73) Assignee: Japan Science and Technology Agency, Saitama (JP)

(*) Notice: Subject to any disclaimer, the term of this patent is extended or adjusted under 35 U.S.C. 154(b) by 268 days.

(21) Appl. No.: 13/201,285

(22) PCT Filed: Feb. 12, 2010

(86) PCT No.: PCT/JP2010/000859
§ 371 (c)(1), (2), (4) Date: Oct. 24, 2011

(87) PCT Pub. No.: WO2010/092818
PCT Pub. Date: Aug. 19, 2010

(65) Prior Publication Data
US 2012/0041150 A1  Feb. 16, 2012

(30) Foreign Application Priority Data
Feb. 13, 2009 (JP) ................. 2009-030628

(51) Int. Cl.
C08F 8/42 (2006.01)
B82B 3/00 (2006.01)
B82Y 99/00 (2011.01)
C08J 3/14 (2006.01)
C22C 5/02 (2006.01)
B22F 1/00 (2006.01)

(52) U.S. Cl.
CPC ... C08J 3/14 (2013.01); C22C 5/02 (2013.01); B22F 1/0062 (2013.01); C08F 8/42 (2013.01); B82B 3/00 (2013.01)
USPC ........... 525/371; 525/280; 525/245; 525/246; 524/403; 524/413; 524/139; 524/435; 524/432; 524/431; 524/430

(58) Field of Classification Search
CPC ............ B22F 1/0062; C08J 3/14; C22C 5/02; C08F 8/42; B82B 3/00
USPC ......... 524/403, 413, 439, 435, 432, 431, 430; 525/280, 245, 246, 370, 371
See application file for complete search history.

(56) References Cited

U.S. PATENT DOCUMENTS
4,948,739 A  8/1990  Charmot

FOREIGN PATENT DOCUMENTS
JP  64-014241  1/1989
JP  09-188778  7/1997
JP  11-217511  8/1999
(Continued)

OTHER PUBLICATIONS
Brust et al., "Synthesis of Thiol-derivatised Gold Nanoparticles in a Two-phase Liquid-Liquid System", Chemical Communications, 1994, pp. 801-802.
(Continued)

Primary Examiner — Mark Kaucher
(74) Attorney, Agent, or Firm — Greenblum & Bernstein, P.L.C.

(57) ABSTRACT

An object of the present invention is to provide an inorganic-organic hybrid particle which has a structure where an organic material composed of two or more different components forms separate phases, wherein an inorganic material is included in the phase, and a method for producing the inorganic-organic hybrid particle. The above object is solved by an inorganic-organic hybrid particle which has a structure where an organic material composed of two or more different components forms separate phases, wherein one or more inorganic materials are included in at least one phase.

5 Claims, 15 Drawing Sheets

(56) References Cited

FOREIGN PATENT DOCUMENTS

| | | | |
|---|---|---|---|
| JP | 2003-226708 | 8/2003 | |
| JP | 2006-077076 | 3/2006 | |
| JP | 2007-332187 | 12/2007 | |
| WO | 2006/080319 | 8/2006 | |
| WO | 2008/034675 | 3/2008 | |
| WO | WO 2008135749 A1 * | 11/2008 | ................ C08J 3/20 |

OTHER PUBLICATIONS

Paunov et al., "Supraparticles and "Janus" Particles Fabricated by Replication of Particle Monolayers at Liquid Surfaces Using a Gel Trapping Technique", Advanced Materials, 2004, pp. 788-791.

Perro et al., "Towards large amounts of Janus nanoparticles through a protection-deprotection route", Chemical Communications, 2005, pp. 5542-5543.

Yabu et al., "Unique Phase-Separation Structures of Block-Copolymer Nanoparticles", Advanced Materials, 2005, pp. 2062-2065.

International Preliminary Report on Patentability for International Application No. PCT/JP2010/000859, mail date is Oct. 27, 2011.

Search report from International Application No. PCT/JP2010/000859, mail date is May 25, 2010.

* cited by examiner

TEM image of gold nanoparticles

Particle size histogram of gold nanoparticles

TEM image of gold nanoparticle-PS-b-PI
composite microparticles (bar: 100 nm)

TEM image of synthesized
CdS nanoparticles

TEM image of CdS nanoparticle-
block copolymer-composite

METHOD FOR PRODUCING INORGANIC-ORGANIC HYBRID PARTICLE

TECHNICAL FIELD

The present invention relates to an inorganic-organic hybrid particle and a method for producing the same.

BACKGROUND ART

Microparticles in the nanometer and micrometer range apparently exhibit quantal properties inherent to materials of such size, the surface-to-volume ratio thereof is significantly larger than that of a smooth substrate or the like, and the surface condition thereof is highly active. For these reasons, such microparticles have drawn attention as functional materials having optical, electronic, vital, and other functions.

If nano-sized microparticles could be produced with the use of materials composed of two or more different components having different properties, and in particular, two or more properties could be imparted to a single microparticle and the application range thereof could be further expanded.

As techniques for producing microparticles comprising a material composed of two or more different components, attempts to apply microparticles to an adequate substrate and coat the same with metal via sputtering or other means and attempts to synthesize a polymer brush on the surface to prepare asymmetric microparticles (Janus microparticles) have been made (Non-patent Document 1). In addition, attempts to bind polystyrene microparticles to silica particles with the use of an emulsion to prepare dumbbell-shaped microparticles and attempts to synthesize polymer brushes have been made (Non-patent Document 2). These techniques, however, are disadvantageous in that they require many steps and offer low productivity.

A method referred to as "seed polymerization" is known as a method of forming asymmetric and irregular-shaped microparticles (Patent Document 1). However, this method is disadvantageous in that it requires a complicated procedure, one of the two types of polymers used is always positioned on the microparticle surfaces, and the orientation among polymers in the microparticles is significantly limited.

As a method for producing microparticles comprising polymers based on principles different from those of the aforementioned methods, a method has been reported in which a single organic material, such as a homopolymer or block copolymer, is used, a poor solvent made of the aforementioned material compatible with a good solvent is added to a solution of an organic material dissolved in a good solvent to lower the concentration of the material, and microparticles comprising the organic material are prepared ((Patent Document 2, and Non-patent Document 3). In addition, a method for producing microparticles with the use of an organic material composed of two or more different components has been reported (Patent Document 3).

PRIOR ART DOCUMENTS

Patent Documents

Patent Document 1: JP Patent Publication (Kokai) No. 2003-226708 A
Patent Document 2: JP Patent Publication (Kokai) No. 2006-77076 A
Patent Document 3: JP Patent Publication (Kokai) No. 2007-332187 A.

Non-Patent Documents

Non-patent Document 1: V. N. Paunov et al., Advanced Materials, 2004, vol. 16, No. 9, p. 788
Non-patent Document 2: Adeline Perro et al., Chemical Communications, 2005, Vol. 44, p. 5542
Non-patent Document 3: Hiroshi Yabu et al., Advanced Materials, 2005, vol. 17, No. 17, p. 2062

SUMMARY OF THE INVENTION

Object to be Solved by the Invention

Microparticles used for electronic devices such as capacitors, optical devices such as metamaterials, and display devices such as display pixels of electrophoretic display devices preferably comprise inorganic materials, such as metals. However, no techniques for producing an inorganic-organic hybrid particle which has a structure where an organic material composed of two or more different components forms separate phases, wherein inorganic material is included in the phase, have yet been known.

Accordingly, the present invention is intended to provide an inorganic-organic hybrid particle which has a structure where an organic material composed of two or more different components forms separate phases, wherein an inorganic material is included in the phase, and a method for producing the inorganic-organic hybrid particle. Further, the present invention is intended to provide various types of devices using the inorganic-organic hybrid particle.

Means for Attaining the Object

The present inventors have conducted concentrated studies in order to attain the above objects. As a result, they succeeded in producing a metal ion-organic hybrid particle which comprises metal in one phase by using a metal as an inorganic material and a block copolymer as an organic material comprising a component having a coordination group capable of coordinating to such metal. The metal portions of the particle obtained by such technique, however, are in an ionic state, and such particles were non-conductive and incomplete metal ion-organic hybrid particles. Thus, the present inventors reduced inorganic ions in the particles and then succeeded in obtaining a metal-organic hybrid particle in which inorganic portions had been nonionized.

In addition, the present inventors succeeded in producing a metal/organic hybrid particle comprising metals in one phase by preparing a complex of an organic material and a metal ion by coordinating a metal ion to the first block copolymer constituted by two types of components, reducing metal ions in the complex to obtain metals covered with organic materials, and using the metals covered with organic materials and the second block copolymer constituted by two types of components. The present invention has been completed based on such findings.

Thus, the present invention provides an inorganic-organic hybrid particle which has a structure where an organic material composed of two or more different components forms separate phases, wherein one or more inorganic materials is contained in at least one phase, and the organic material component constituting a phase containing an inorganic material has a coordination group coordinated to the inorganic materials.

Preferably, the particle size is from 10 nm to 100 μm.

Preferably, the inorganic material is microparticle having particle size of 0.5 nm to 100 nm.

Preferably, the inorganic material is metal, metal compound, or alloy.

Preferably, the organic material is a block copolymer.

Preferably, the organic material is an amphipathic block copolymer.

Preferably, the coordination group coordinated to the inorganic material is a pyridine, amine, carboxylic acid, or thiol group.

Another aspect of the present invention provides a method for producing an inorganic-organic hybrid particle which comprises: (1) to a solution containing an organic material composed of two or more different components dissolved in a good solvent, adding a poor solvent of an organic material compatible with the good solvent, evaporating the good solvent, and obtaining an organic particle which has a structure where the organic material forms separate phases; (2) mixing the organic particle with a salt of at least one inorganic material capable of coordinating to at least one organic component to obtain an inorganic-ion-organic hybrid particle; and (3) reducing the inorganic-ion-organic hybrid particle to obtain an inorganic-organic hybrid particle.

Another aspect of the present invention provides a method for producing an inorganic-organic hybrid particle which comprises: (1) dissolving a first organic material composed of two or more different components and a salt of one or more inorganic materials capable of coordinating to at least one component of the first organic material in a good solvent for the first organic material to obtain a micelle complex of the first organic material and inorganic ion; (2) reducing the inorganic ion of the micelle complex to obtain an inorganic material coated with an organic material; and (3) to a solution wherein the inorganic material coated with the organic material and a second organic material comprising two or more different components (wherein at least one component is the same as that of the first organic material) is dissolved in a good solvent for the second organic material, adding a poor solvent for the second organic material compatible with the good solvent, and evaporating the good solvent to obtain an inorganic-organic hybrid particle.

Preferably, particle size of the inorganic-organic hybrid particle is from 10 nm to 100 μm.

Preferably, the inorganic material is microparticle having particle size of 0.5 nm to 100 nm.

Preferably, the inorganic material is metal, metal compound, or alloy.

Preferably, the organic material composed of two or more different components is composed of two or more different monopolymer components.

Preferably, the organic material composed of two or more different components is a block copolymer composed of two or more different organic materials.

Another aspect of the present invention provides an inorganic-organic hybrid particle which is obtained by the production method according to the present invention.

Another aspect of the present invention provides an electronic device which comprises the inorganic-organic hybrid particle according to the present invention.

Another aspect of the present invention provides an optical device which comprises the inorganic-organic hybrid particle according to the present invention.

Another aspect of the present invention provides a display device which comprises the inorganic-organic hybrid particle according to the present invention.

Effects of the Invention

The inorganic-organic hybrid particle of the present invention comprises two or more different components (polymers) as separate phases in a single particle, and comprises an inorganic material in at least one phase. Thus, the inorganic-organic hybrid particle of the present invention can be used as polyfunctional particles having asymmetrical functions resulting from the presence of an inorganic phase and a non-inorganic phase in a single particle. When an inorganic material is metal, for example, the inorganic-organic hybrid particles of the present invention can be applied to electronic devices such as capacitors, optical devices such as metamaterials, and display devices such as display pixels of electrophoretic display devices. In addition, the production method of the present invention is capable of mass-producing such polyfunctional particles simply and rapidly in a very small number of steps.

EMBODIMENTS OF THE INVENTION

Hereafter, embodiments of the present invention are described in detail.

[1] Inorganic-Organic Hybrid Particle

The inorganic-organic hybrid particles of the present invention has a structure where an organic material composed of two or more different components forms separate phases, wherein one or more inorganic materials are contained in at least one phase.

Figure 9:
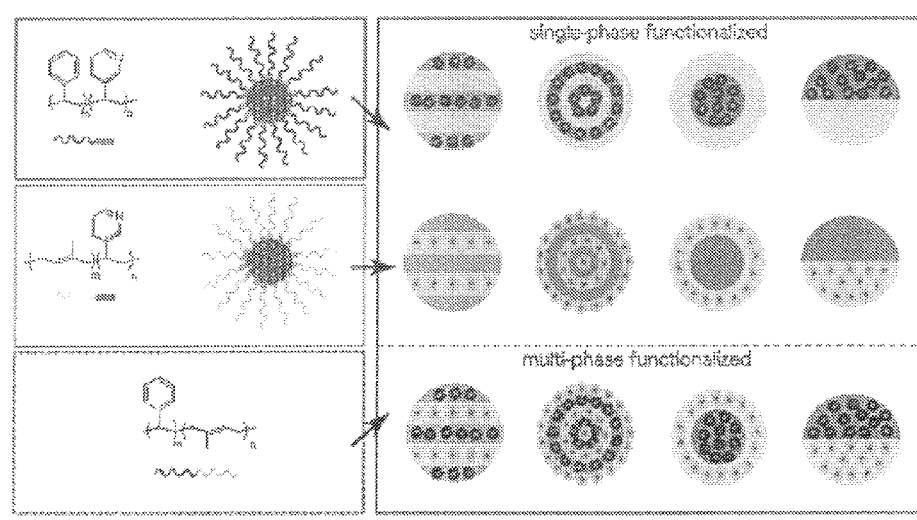
FIG. 9 schematically shows putative inorganic-organic hybrid particles.

FIG. 9 schematically shows an example of a constitution of inorganic-organic hybrid particles. In FIG. 9, particles each have phases composed of a two-component organic material (i.e., a phase comprising a first organic component and another phase comprising a second organic component), and either or both phases comprise the first or second inorganic material. Preferably, a phase composed of an organic component is an assembly or aggregate of organic polymers.

As shown in FIG. 9, the number of phases; i.e., the number of types of organic components, of the inorganic-organic hybrid particles is not particularly limited, provided that it is two or more. A particle having an asymmetric phase structure, a particle having a symmetric phase structure, a particle having inward and outward phases, and a particle having a phase structure involving a combination of the aforementioned phase structures are within the scope of the present invention.

An organic material composed of two or more different components that can be used for the inorganic-organic hybrid particles can be selected and combined with reference to paragraphs 0016 and 0017 of JP Patent Publication (Kokai) No. 2006-77076 A and paragraphs 0021 to 0026 of JP Patent Publication (Kokai) No. 2007-332187 A.

Examples of an organic material composed of two or more different components include an organic material composed of two or more different components constituting a single molecule in combination and an organic material composed of two or more different components existing independently of each other. A specific example of an organic material composed of two or more different components constituting a single molecule in combination is a block copolymer made of two or more monopolymer components constituting a single molecule via a covalent bond. A specific example of an organic material composed of two or more different components existing independently of each other is a material composed of two or more monopolymer components.

When an organic material composed of two or more different components is a block copolymer, for example, a phase-separated structure results from differences in physical properties among organic components constituting such organic material and, more specifically, a phase-separated structure results from the repulsive force acting on organic components, although the situation is not limited thereto. Accordingly, there are differences in physical properties or repulsive forces between organic components constituting a block copolymer, leading to the formation of a phase-separated structure. However, such repulsive force is exerted by adjacent spherical or pseudospherical microparticles. In general, accordingly, such differences in physical properties or repulsive force are not necessarily significantly large to form a phase-separated structure.

Specific examples of block copolymers that can be used for inorganic-organic hybrid particles include: aromatic hydrocarbon-aliphatic hydrocarbon block copolymers, such as a styrene-butadiene block copolymer and a styrene-isoprene block copolymer; aromatic hydrocarbon-polar aliphatic compound block copolymers, such as a styrene-acrylic acid block copolymer, a styrene-sodium acrylate block copolymer, and a styrene-polyethylene glycol (PEG) block copolymer; styrene-vinylpyridine block copolymers, such as a fluorene-methyl methacrylate (MMA) block copolymer; and aromatic hydrocarbon-polar aromatic compound block copolymers, such as a styrene-polyallylamine block copolymer. Among them, a styrene-butadiene block copolymer or a styrene-isoprene block copolymer is used to form a phase-separated structure, and a styrene-vinylpyridine block copolymer, a styrene-acrylic acid block copolymer, or a styrene-polyallylamine block copolymer is used to form a metal complex, for example.

When an organic material composed of two or more different components is a material composed of two or more different monopolymer components, for example, any polymers can be selected and combined without particular limitation, provided that a certain differences in solubility parameters between different polymers are observed. A water-soluble polymer, a water-insoluble polymer, a copolymer, and other any polymers can be used without particular limitation. Examples thereof include, but are not limited to, those described below. Numerical values shown in parentheses indicate the solubility parameters of polymers.

1) Water-soluble polymers, such as N-isopropylacrylamide (NIPAM, 22.8) and polyethylene glycol (PEG, 20.2)

2) Water-insoluble polymers, such as 1,4-cis-isoprene (16), isoprene elastomer (17), polystyrene (18), polybutadiene (17.5), polyisoprene (16 to 17), polymethyl methacrylate (PMMA, 23), poly-n-butyl acrylate (18), polyvinyl chloride (19), polyacrylonitrile (26), and polylactic acid (PLA, 19)

3) Copolymers, such as a butadiene-styrene (94:6) copolymer (16.45 to 16.64), a butadiene-styrene (90:10) copolymer (17.13), a butadiene-styrene (85:15) copolymer (16.55), and a butadiene-styrene copolymer with a styrene content of at least 25 (17.5)

Two or more monopolymer components constituting inorganic-organic hybrid particles are selected from among the polymers listed above in such a manner that differences in solubility parameters among polymers range from 0.1 to 10. Two types of polymers are selected so as to form two-phase polymer particles; i.e., a combination of Polymer A and Polymer B is selected so as to adjust differences in solubility parameters therebetween from 0.1 to 10, for example. Three types of polymers are selected so as to form three-phase polymer particles; i.e., Polymer A, Polymer B, and Polymer C are selected so as to adjust differences in solubility parameters between any combination of Polymers A, B, and C; i.e., Polymer A and Polymer B, Polymer A and Polymer C, and Polymer B and Polymer C, to 0.1 to 10.

Examples of combinations of two or more different monopolymer components that satisfy the conditions for differences in solubility parameters include, but are not limited to, PEG and NIPAM, polystyrene and polyisoprene, polystyrene and polybutadiene, polystyrene and PLA, and polystyrene and polybutyl acrylate.

The number of inorganic materials used for inorganic-organic hybrid particles is not particularly limited, provided that it is 1 or more. Inorganic materials are contained in at least one phase constituted by organic components of the inorganic-organic hybrid particles in a non-ionized state. As shown in FIG. 9, a single type of inorganic material may be contained in a single phase, or two types of inorganic materials may be contained in two phases. As described in Example 2, further, a single type of inorganic material may be contained in two phases because of different particle sizes. Embodiments of an inorganic material to be contained in a phase are not particularly limited. Examples include an inorganic material contained in a phase via a coordination group of an organic component capable of coordinating (or capturing or binding) an inorganic material and an inorganic material coated with an organic component and contained in a phase via coating. Coordination groups capable of coordinating (or capturing or binding) an inorganic material are not particularly limited. Examples of groups that can be used include pyridine, amine, carboxylic acid, and thiol groups.

Inorganic materials that can be used for inorganic-organic hybrid particles are not particularly limited. Examples thereof include: metals, such as gold (Au), silver (Ag), platinum (Pt), palladium (Pd), rhodium (Rh), iridium (Ir), ruthenium (Ru), osmium (Os), and copper (Cu); metal compounds, such as CdS, CeSe, CeTe, and ZnS; ferrimagnetic materials, such as $Fe_2O_3$; and alloys, such as Ag/Au alloys and Au/Pt alloys. When inorganic-organic hybrid particles are used for electronic devices, optical devices, or display devices, it is preferable that an inorganic material be a metal, metal compound, or alloy.

Particle sizes of inorganic-organic hybrid particles are not particularly limited. In order to make apparent quantal properties inherent to the material and increase the surface-to-volume ratio to realize highly active surface conditions on carriers, particle sizes are preferably 1 nm to 1,000 μm, more preferably 10 nm to 100 μm, and further preferably 100 nm to 10 μm.

[2] Method for Producing Inorganic-Organic Hybrid Particles (1)

A method for producing the inorganic-organic hybrid particles of the present invention and an inorganic-organic hybrid particle which is produced by such method are within the scope of the present invention. An embodiment of the method for producing the inorganic-organic hybrid particle of the present invention (hereafter, it may be referred to as the method for producing inorganic-organic hybrid particle (1)) comprises: (1) to a solution containing an organic material composed of two or more different components dissolved in a good solvent, adding a poor solvent of the organic material compatible with the good solvent, evaporating the good solvent, and obtaining organic particles having a structure where the organic material forms separate phases; (2) mixing the organic material with a salt of at least one inorganic material capable of coordinating to the organic component to obtain inorganic-ion-organic hybrid particles; and (3) reducing the inorganic-ion-organic hybrid particles to obtain inorganic-organic hybrid particles.

The method for producing inorganic-organic hybrid particles (1) can be implemented with reference to paragraphs 0018 to 0029 of JP Patent Publication (Kokai) No. 2006-77076 A and paragraphs 0028 to 0047 of JP Patent Publication (Kokai) No. 2007-332187 A.

In the method for producing inorganic-organic hybrid particles (1), an organic material composed of two or more different components is not particularly limited. A block copolymer of an organic material composed of two or more different components or a component containing two or more different monopolymer components is preferable. The block copolymer comprising two or more different organic materials and a component containing two or more different monopolymer components described in [1] above can be used.

When two or more different organic materials constitute a block copolymer, for example, a good solvent for the block copolymer is selected in accordance with the type of block copolymer, without particular limitation, and various organic solvents are generally used. A poor solvent used for precipitating particles of the block copolymer is compatible with a good solvent for the block copolymer that has low solubility in the block copolymer. A poor solvent for the block copolymer is selected in accordance with the type of block copolymer, and a compound with high polarity is generally used. Accordingly, a good solvent for the block copolymer that is compatible with a poor solvent for the block copolymer is generally selected from among compounds with moderate polarity.

Specific examples of good solvents for the block copolymer include: ethers, such as tetrahydrofuran (THF), dioxane, and diethyl ether; halogenated hydrocarbons, such as chloroform; aromatic compounds, such as benzene; aliphatic hydrocarbon compounds, such as n-hexane and cyclohexane; ketones, such as ethyl methyl ketone and acetone; esters, such as ethyl acetate; alcohols, such as methanol and ethanol; and nitriles, such as acetonitrile.

A poor solvent for the block copolymer is selected in accordance with the type of block copolymer and the type of good solvent for the block copolymer, and a compound with high polarity is generally used. In order to sufficiently proceed with a procedure of evaporating a good solvent for the block copolymer so as to precipitate particles, use of a poor solvent for the block copolymer having a boiling point higher than that of a good solvent for the block copolymer is preferable.

Specific examples of poor solvents for the block copolymer include: the most common solvent (i.e., water), as well as aliphatic hydrocarbons, such as n-hexane and n-heptane; alcohols, such as butyl alcohol and propyl alcohol; highly polar organic solvents, such as N-methylpyrrolidone, dimethylformamide, and dimethyl sulfoxide; and acids, such as acetic acid.

A poor solvent that is compatible with a solution of two or more polymers dissolved in a good solvent is added thereto, and the good solvent is diluted. This rapidly supersaturates a solute (a polymer), which causes fluctuations in the concentration of the solution that create core particles, and particles of a constant size can be prepared upon growth of such core particles.

When two or more different organic materials are two or more different monopolymer components, for example, a mixed solution comprising two or more different monopolymer components dissolved in a good solvent is used. Two or more monopolymer components that adjust differences in solubility parameters to 0.1 to 10 are used, and a good solvent and a poor solvent that can be selected in accordance with the solubility parameters of a component containing two or more different monopolymer components are used. Thus, a single type of polymer particle that comprises two or more different monopolymer components as separate phases can be produced without the formation of different types of particles. The inorganic-organic hybrid particles of the present invention can be obtained based on such principle.

A good solvent and a poor solvent used are compatible with each other when two or more different organic materials are two or more different monopolymer components. However, these solvents are significantly different from each other in tams of solubility of two or more different monopolymer components, and a solvent with high/strong solubility and a solvent with low/weak or substantially no solubility are adequately selected and used in combination as a good solvent and a poor solvent, respectively.

When two or more different organic materials are two or more different monopolymer components, a good solvent exhibiting 5.0 or smaller differences in solubility parameters from each of the two or more different monopolymer components is preferably used. Such good solvent can be adequately selected in accordance with two or more different monopolymer components used. A poor solvent exhibiting 30 or smaller differences in solubility parameters from the solubility parameters of the good solvent selected in the manner described above may be selected.

In such a case, the combination of a good solvent and a poor solvent that are sufficiently miscible with each other is preferable. A good solvent and a poor solvent that are selected so as to satisfy the conditions described above based on the solubility parameters are sufficiently miscible with each other. As a result, a good solvent can be evenly diluted within a short period of time, and particles with narrow particle size distribution and uniform average size can be produced.

Examples of good solvents and poor solvents used when two or more different organic materials are two or more different monopolymer components include tetrahydrofuran (THF, 18.6), dimethyl ether (DME, 18.0), benzene (18.8), toluene (18.2), chloroform (19.0), acetone (20.3), methanol (29.7), ethanol (26), water (47.9), dimethylformamide (DMF, 24.8), dimethyl sulfoxide (DMSO, 29.7), dioxane (16.2), acetonitrile (24.3), 1-propanol (24.3), and isopropanol (23.5). Numerical values shown in parentheses indicate the solubility parameters of solvents.

Regardless of whether an organic material composed of two or more different components is a block copolymer composed of two or more different components or two or more different monopolymer components, a combination of a good solvent and a poor solvent used for the method for producing inorganic-organic hybrid particles is preferably determined, so as to adjust the boiling point of a poor solvent to be higher than that of a good solvent, and the difference therebetween within 20 degrees. If such conditions are satisfied, a good solvent can be selectively and easily removed from a mixture of a good solvent and a poor solvent.

A good solvent and a poor solvent can be adequately selected, provided that such solvents have properties as described above. In such a case, it is preferable that the known data regarding the solubility parameters of an organic material composed of two or more different components with regard to various types of solvents, compatibility between solvents, boiling points, and the like be collected or confirmed and taken into consideration.

Examples of combinations of an organic material composed of two or more different components and a good solvent and a poor solvent used for such organic materials include, but are not limited to, PEG+NIPAM+water (a good solvent)+DMSO (a poor solvent), or 1-propanol, polyisoprene+polystyrene+THF (a good solvent)+water (a poor solvent).

According to the method for producing inorganic-organic hybrid particles (1), a poor solvent for organic materials compatible with the good solvent is added to a solution containing an organic material composed of two or more different components dissolved in a good solvent, and the good solvent is evaporated to obtain a first particle dispersion. The first particle dispersion comprises organic particles having a structure where two or more different organic materials form separate phases. The concentration of an organic material composed of two or more different components dissolved in a good solvent is not particularly limited, provided that it is the saturating concentration or lower. For example, such concentration is between the saturating concentration and approximately 1/100 of the saturating concentration.

The amount of the poor solvent added is adequately determined by taking the type of organic material composed of two or more different components, types of good solvent and poor solvent, sizes of particles to be produced, and other conditions into consideration. In general, a poor solvent is added in an amount 0.5 to 10 times larger than the amount of a solution containing an organic material composed of two or more different components.

The speed at which a poor solvent is added to a solution comprising two or more different organic materials is not particularly limited, and a poor solvent may be added in accordance with general experimental procedures. It is preferable that duration be determined by: [liquid volume×10]/minute or longer, although the duration varies depending on the concentrations of two or more organic components in a solution comprising an organic material composed of two or more different components. The temperature at which the method for producing inorganic-organic hybrid particles (1) is carried out may be determined by taking the boiling point of the solvent used into consideration. It can be carried out at any temperature approximately between 0° C. and 90° C. and preferably at room temperature.

The temperature at which a good solvent is evaporated is not particularly limited. If boiling points or other conditions of a good solvent and a poor solvent are taken into consideration, a good solvent can be evaporated at, for example, any temperature between 0° C. and 90° C. and preferably at room temperature. Particle size can be controlled by adjusting concentrations of two or more different monopolymer components in a good solvent and the amount of a poor solvent to be added (i.e., the proportion of the amount of the poor solvent to the amount of the good solvent). In addition, a good solvent can be evenly diluted within a short period of time, so that particles with narrow particle size distribution can be produced.

A good solvent is preferably evaporated under reduced pressure in order to produce particles with small sizes and uniform particle size distribution. Pressure may be reduced to $10^{-3}$ Pa to 10 kPa, and preferably to 10 Pa to 1 kPa. Such conditions can be realized with the use of, for example, a rotary evaporator, a pressure-reducing pump, or other general apparatuses for pressure reduction. Accordingly, the method for producing inorganic-organic hybrid particles (1) can be easily carried out in laboratory or at industrial production levels without the need for large-scale equipment for the maintenance of ultra-high-vacuum conditions.

It is preferable that removal of a good solvent by evaporation under such reduced pressure be completed within 3 hours after the initiation of pressure reduction at a maximum. Specifically, the total volume (100%) of the good solvent to be removed is preferably removed by evaporation at 0.01 volume percent or more per second. When the total volume of a good solvent is relatively small, removal by evaporation can be completed substantially instantaneously. If it is practically difficult to remove a good solvent by evaporation within 1 hour due to the large total volume of the good solvent, a solution to which a poor solvent had been added may be fractionated to result in adequate amounts, and each fraction may be subjected to solvent removal.

This removal of a good solvent by evaporation under reduced pressure further reduces the particle sizes of microparticles by approximately 10% to 50%, compared with microparticles produced without such removal procedure. In addition, the standard deviation in particle size distribution is reduced by approximately 10%, and particles having sizes with higher uniformity can be produced. According to the method for producing inorganic-organic hybrid particles (1), organic particles having a structure where organic materials are separated in two or more phases can be recovered from a good solvent diluted with the addition of a poor solvent within approximately several minutes to 2 or 3 hours, although such time varies depending on the amount of solvent to be removed.

When an organic material composed of two or more different components is a block copolymer comprising two or more different organic components, particle size of organic particles contained in the first particle dispersion can be controlled by adjusting the concentration of organic materials in the solution containing a block copolymer dissolved in a good solvent and the amount of a poor solvent to be added (the proportion thereof to the amount of a good solvent). Higher concentrations of the block copolymer in the solution containing a block copolymer dissolved in a good solvent yield larger particle sizes, and lower concentrations yield smaller particle sizes. As the amount of a poor solvent to be added (the proportion thereof to the amount of a good solvent) increases, particle size becomes smaller. As the amount of a poor solvent to be added (the proportion thereof to the amount of a good solvent) decreases, particle size becomes larger. In addition, solvents that are sufficiently miscible with each other are selected as a good solvent and a poor solvent, and a solution is uniformly diluted within a short period of time. Thus, microparticles with narrower particle size distribution can be produced.

According to the method for producing inorganic-organic hybrid particles (1), a salt of at least one inorganic material capable of coordinating to at least one organic component is added to (mixed with) the first particle dispersion to obtain a second particle dispersion. In the second particle dispersion, inorganic-ion-organic hybrid particles having a structure where an organic material composed of two or more different components forms separate phases wherein inorganic ions derived from a salt of one or more inorganic materials are contained in at least one phase, are generated.

As a salt of an inorganic material to be added, the salt of inorganic material described in [1] can be used. A salt of an inorganic material can be added to the first particle dispersion in the form of a solid or liquid. The concentration of a salt of an inorganic material to be added is not particularly limited, provided that it is the saturating concentration or lower. For example, such concentration is between the saturating concentration and approximately $1/100$ of the saturating concentration. A means for adding a salt of an inorganic material to the first particle dispersion is not particularly limited, and generally known techniques can be employed without limitation. After a salt has been added, the resultant can be subjected to agitation or other procedures, according to need.

Inorganic portions of inorganic-ion-organic hybrid particles contained in the second particle dispersion are in an ionized state. In the method for producing inorganic-organic hybrid particles (1), accordingly, inorganic ions in the inorganic-ion-organic hybrid particles are reduced via generally known reduction means, such as UV application or with the use of a reducing agent.

Figure 10:
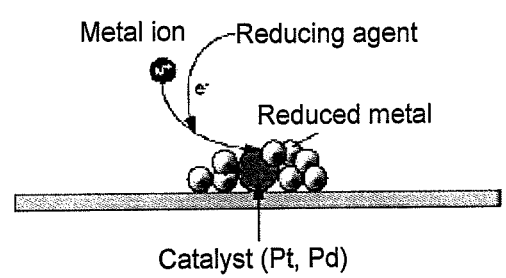
FIG. 10 schematically shows nonelectrolytic plating.

In the method for producing inorganic-organic hybrid particles (1), nonelectrolytic plating can be carried out in order to obtain inorganic-organic hybrid particles by adding a reducing agent and a catalyst to the second particle dispersion. FIG. 10 schematically shows the process of nonelectrolytic plating. Nonelectrolytic plating is a method of using a reducing agent and a catalyst (e.g., Pt or Pd) to reduce metal ions so as to selectively deposit metals on a catalyst. This plating technique can be used in a dispersion system, such as a solution with no need for an electrode.

A reducing agent is not particularly limited. Examples thereof that can be used include hydrazine, urea, sulfur dioxide, and sodium thiosulfate (Hypo). A catalyst is not particularly limited, and Ag, Au, or Ni can be used, for example. A reducing agent and a catalyst can be added to the second particle dispersion in the form of a solid or liquid. The concentration of a reducing agent to be added is not particularly limited, provided that it is the saturating concentration or lower. For example, such concentration is between the saturating concentration and approximately $1/100$ of the saturating concentration. The concentration of a catalyst to be added is not particularly limited, and it is 0.01% to 1 wt %, for example. A means for adding a reducing agent and a catalyst to the first particle dispersion is not particularly limited, and generally known techniques can be employed without limitation. After a reducing agent and a catalyst have been added, the resultant can be subjected to agitation or other procedures, according to need.

Figure 11:
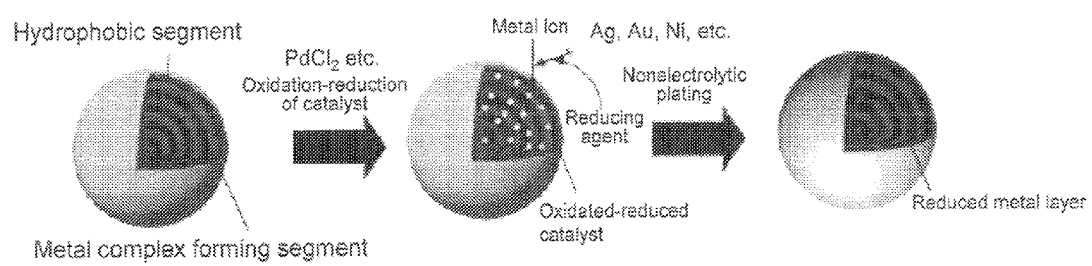
FIG. 11 shows a summary of an embodiment of the production method of the present invention.

FIG. 11 schematically shows a method for producing inorganic-organic hybrid particles by the method for producing inorganic-organic hybrid particles (1), wherein inorganic ions are reduced from organic particles in which organic components are separated in two or more phases through inorganic-ion-organic hybrid particles in which inorganic ions are coordinated to a single phase of the organic particles.

[3] Method for Producing Inorganic-Organic Hybrid Particles (2)

Another embodiment of the method for producing the inorganic-organic hybrid particle of the present invention (hereafter, it may be referred to as the method for producing inorganic-organic hybrid particles (2)) comprises: (1) dissolving a first organic material composed of two or more different components and a salt of one or more inorganic materials capable of coordinating to at least one component of the first organic material in a good solvent for the first organic material to obtain a micelle complex of the first organic material and inorganic ion; (2) reducing the inorganic ion of the micelle complex to obtain an inorganic material coated with an organic material; and (3) to a solution wherein the inorganic material coated with the organic material and a second organic material comprising two or more different components (wherein at least one component is the same as that of the first organic material) are dissolved in a good solvent for the second organic material, adding a poor solvent for the second organic material compatible with the good solvent, and evaporating the good solvent to obtain an inorganic-organic hybrid particle.

In the method for producing inorganic-organic hybrid particles (2), the first organic component has a coordination group which is coordinated to an inorganic material. A micelle complex is formed when an ionized inorganic material is coordinated to an organic component dissolved in a good solvent via such coordination group. By reducing an inorganic ion of the micelle complex by the method described in [2] above or by other means, an inorganic material coated with an organic material can be obtained. To a solution prepared by dissolving the inorganic material coated with an organic material and a second organic material composed of two or more different components (wherein at least one component is the same as the first organic component) in a good solvent for the second organic material, subsequently, a poor solvent for the second organic material compatible with the good solvent is added, and the good solvent is evaporated. Thus, inorganic-organic hybrid particles can be obtained.

In the method for producing inorganic-organic hybrid particles (2), a method for producing an inorganic material coated with an organic material is not particularly limited. Specifically, such inorganic material can be produced by the method described below. A block copolymer having a coordination group is dissolved in a good solvent for the block copolymer (e.g., toluene) under a nitrogen atmosphere, and the resulting solution is agitated for several hours to several tens of hours to form micelles. Subsequently, an inorganic material precursor is added, and the mixture is deaerated and frozen, followed by nitrogen substitution. The resultant is then agitated for several hours to several tens of hours, and the inorganic material precursor is allowed to coordinate to a coordination group to form a complex. The inorganic material precursor is then reduced with the use of a reducing agent (e.g., anhydrous hydrazine) under a nitrogen atmosphere. The resulting solution is added to the poor solvent for the block copolymer (e.g., water) to remove salt, and the good solvent phase is then recovered after phase separation. In order to completely remove salt, centrifugation is carried out to obtain the good solvent dispersion comprising micelles containing an inorganic material coated with an organic material dispersed therein. After the good solvent is removed by evaporation with the use of a rotary evaporator or other means, a micelle solution comprising an inorganic material coated with an organic material can be obtained. The concentration of the inorganic material coated with an organic material in the thus-obtained solution is not particularly limited. For example, such concentration is preferably 0.01 to 1 g/l.

According to the method for producing inorganic-organic hybrid particle (2), an inorganic material coated with an organic material is contained in the outermost phase comprising an organic component of an inorganic material coated with an organic material (a micelle complex) of the inorganic-organic hybrid particles. If the type of organic component of the outermost layer of an organic material coating an inorganic material is changed, accordingly, inorganic-organic hybrid particles comprising an inorganic material in a phase of interest can be obtained.

Other conditions for the method for producing inorganic-organic hybrid particles (2) can be in accordance with the method for producing inorganic-organic hybrid particles (1).

[4] Applications of Inorganic-Organic Hybrid Particles

The inorganic-organic hybrid particle of the present invention and the inorganic-organic hybrid particle which is obtained by the production method of the present invention can be applied to various devices, such as electronic devices, optical devices, or display devices, and applicability thereof to metamaterials or capacitors is particularly high. For example, the organic-inorganic hybrid microparticle obtained in Experiments 1-1, 2-1, or 2-2 has multi-layer structures of dielectrics and metals. Thus, such microparticles are capable of accumulating charges in metal portions, and they can be utilized for electronic devices such as capacitors. The Janus particles obtained in Experiment 2-3 are considered to be capable of changing particle orientation in accordance with the electric field or magnetic field, and such particles can be applied to display devices, such as electrophoretic display devices. In addition, such particles are considered to be applicable to optical devices, such as metamaterials, with the utilization of the optical responses described in Experiment 3.

The inorganic-organic hybrid particles prepared in the form of an array with a metal-dielectric sandwich configuration at a target wavelength or smaller can be used as metamaterials, which are dispersion media realizing a "negative refractive index." Metamaterials can be applied to a technique for preparing a lens having a metal-dielectrics structure at the scale of several nm to several tens of nm when, for example, ultraviolet lithography is carried out. In addition, inorganic-organic hybrid particles can be applied to capacitors.

Hereafter, the present invention is described in greater detail with reference to the examples, although the scope of the present invention is not limited to the following examples.

EXAMPLES

Example 1

Production of Inorganic-Organic Hybrid Particles Via Coordination-Reduction

Inorganic ions were allowed to coordinate to microparticles prepared from a block copolymer having a metal-coordination site, and the inorganic ions were reduced. Thus, inorganic-organic hybrid particles could be produced. Palladium, gold, silver, and the like were usable as inorganic ions. Details are described below.

(Experiment 1-1)

Poly(styrene-b-4-vinylpyridine) was dissolved in tetrahydrofuran (THF) to prepare a solution, water was added, and THF was evaporated at room temperature to obtain a microparticle dispersion. An aqueous solution of 0.2 mM silver nitrate, palladium chloride, or chloroauric acid (500 µl each) was added to 500 µl of a 0.1 mg/ml microparticle dispersion, and the mixture was irradiated with a UV lamp (360 nm) for reduction. After the resultant was purified via centrifugation, the product was observed under a scanning transmission electron microscope (STEM, HD-2000, Hitachi, Ltd.).

(Result 1-1)

Figure 1:
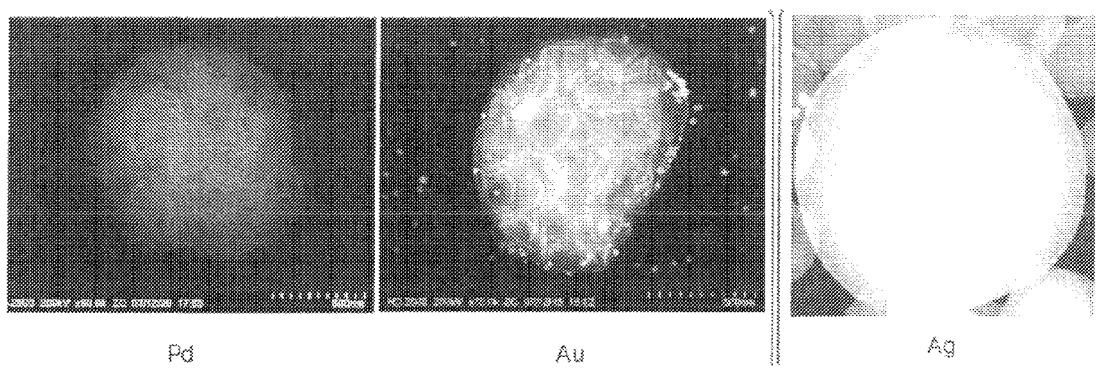
FIG. 1 is a photograph showing STEM observation of inorganic-organic hybrid particles made of silver, gold, or palladium and poly(styrene-b-4-vinylpyridine).

Based on the dark-field STEM image, development of metal-coordinated separate phases was observed inside the microparticles (see FIG. 1)

Example 2

Figure 2:
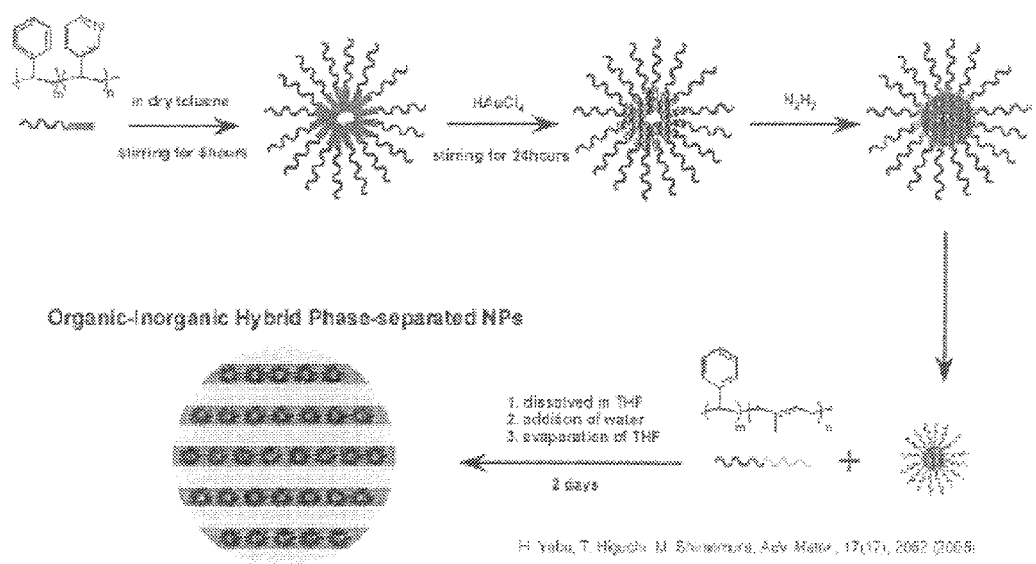
FIG. 2 schematically shows a method for synthesizing block copolymer micelles and a method for producing organic-inorganic hybrid particles having a phase-separated structure.

Production of Inorganic-Organic Hybrid Particles Using Metal Nanoparticle-Containing Block Copolymer Micelles Polystyrene-coated metal nanoparticles were synthesized in the following manner (see FIG. 2). Poly(styrene-b-2-vinylpyridine) (100 mg) was dissolved in 20 ml of toluene (5 g/l) under an $N_2$ atmosphere, the solution was agitated for 5 hours to form micelles, and inorganic precursors were added in the amount of 0.5 equivalents to the amount of the pyridine groups. The resultant was deaerated and frozen, subjected to $N_2$ substitution, and then agitated overnight to form a complex. Subsequently, reduction was carried out with 0.1 ml of anhydrous hydrazine under an $N_2$ atmosphere. The resulting solution was added to water to remove salt, and the toluene phase was recovered after phase separation. Centrifugation was carried out at 3,000 rpm for 1 hour in order to completely remove salt, and a toluene dispersion comprising inorganic-nanoparticle-containing micelles dispersed therein was obtained. After toluene had been removed by evaporation with the use of a rotary evaporator, a solvent of the solution of inorganic-nanoparticle-containing micelles was substituted with THF, and concentration was adjusted to 0.1 g/l. In the case of polyisoprene-coated inorganic nanoparticles, inorganic-organic hybrid particles were produced in the same manner, except for the use of poly(isoprene-b-2-vinylpyridine).

A solution of 0.1 g/l block copolymer in THF was prepared, and the resultant was mixed with the dispersion of inorganic-nanoparticle-containing micelles to bring the total amount of the mixture to 1.0 ml. Water (2 ml) was added at 1 ml/min with agitation, the resultant was allowed to stand at 25° C., and microparticles were precipitated 2 days later as a result of evaporation of THF.

The insides of the microparticles produced were observed under a transmission electron microscope (TEM, H1-7650, Hitachi Ltd.). In order to stain the PI region, 300 μl of an aqueous 0.2 wt % OsO$_4$ solution was added to the same amount of a microparticle dispersion, the mixture was allowed to stand at room temperature for 2 hours, particles were precipitated via centrifugation (12,000 rpm, 5° C., 15 min), and the resultant was washed with pure water. The resultant (1 μl) was added dropwise to an elastic carbon supporting film (grid pitch: 100 μm) to prepare a TEM sample. As a result, inorganic nanoparticles were hybridized to microparticles having separate phases. Also, metal nanoparticles were hybridized to particles having different separate phases, nanoparticles of different metal species, polymer blend particles, and both of the separate phases developed in the block copolymer particles.

(Experiment 2-1)

Polystyrene-coated gold nanoparticles (AuNP@PS) were mixed with a block copolymer of polystyrene and polyisoprene (PS-b-PI) in THF, water was added, and THF was then evaporated at room temperature to obtain microparticles. Microparticle structure was observed under a transmission electron microscope (TEM) (see FIG. 3).

(Result 2-1)

Figure 3:
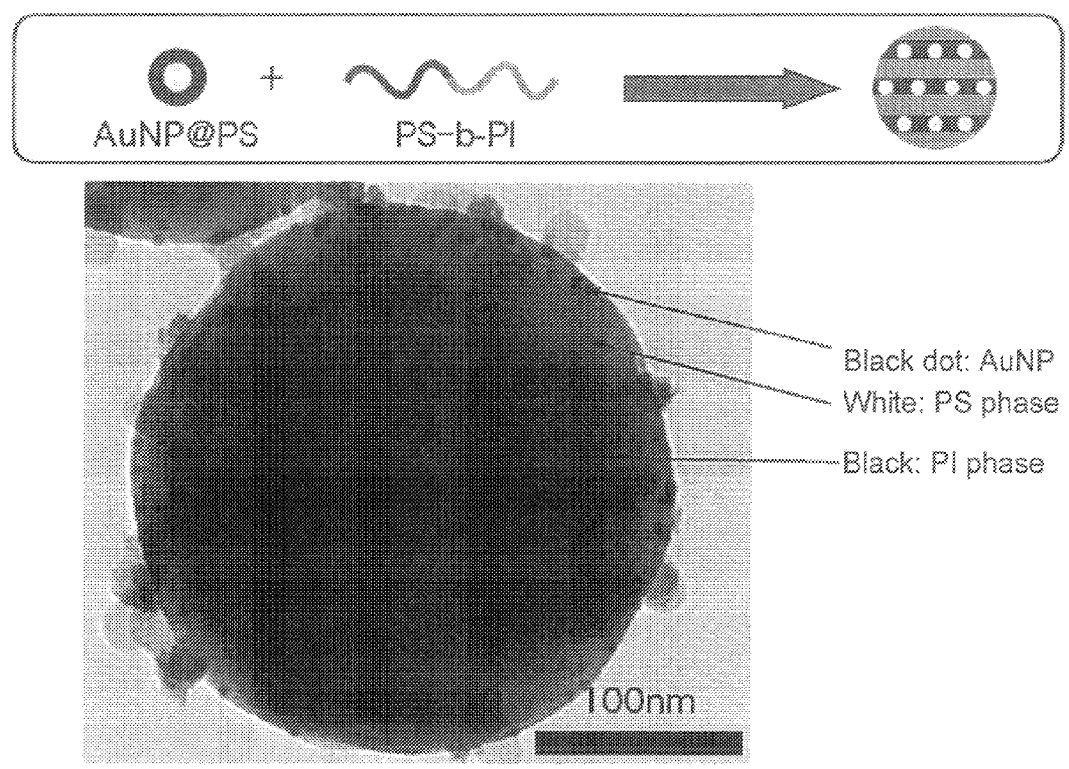
FIG. 3 is a photograph showing TEM observation of inorganic-organic hybrid particles having a lamellar structure made of polystyrene-coated gold nanoparticles and a block copolymer of polystyrene and polyisoprene.

As shown in FIG. 3, inorganic-organic hybrid particles having a lamellar structure composed of unidirectionally stacked polystyrene phases (PS phases) and polyisoprene phases (PI phases), with gold nanoparticles (AuNP) hybridized to the PS phases, were observed.

(Experiment 2-2)

Polystyrene-coated gold particles (AuNP@PS) were mixed with a block copolymer of polystyrene and polyisoprene (PS-b-PI) in THF, water was added, and THF was then evaporated at room temperature to obtain inorganic-organic hybrid particles. The structure of inorganic-organic hybrid particles was observed under a transmission electron microscope (TEM) (see FIG. 4).

(Result 2-2)

Figure 4:
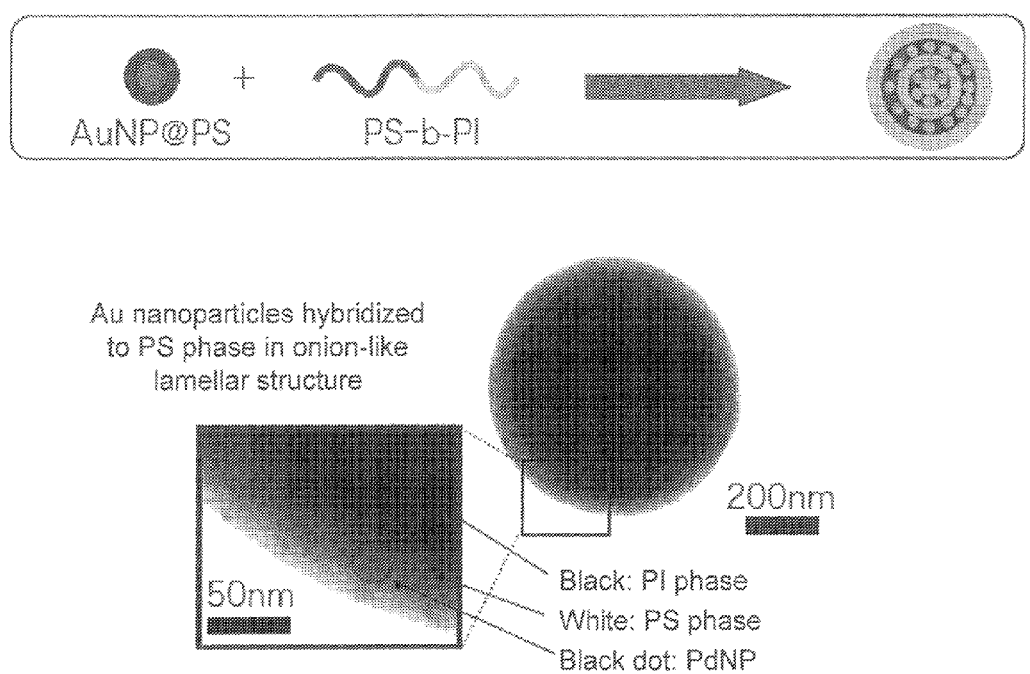
FIG. 4 is a photograph showing TEM observation of inorganic-organic hybrid particles having an onion-like structure made of polystyrene-coated gold palladium particles and a block copolymer of polystyrene and polyisoprene.

As shown in FIG. 4, inorganic-organic hybrid particles having onion-like separate phases of polystyrene phases (PS phases) and polyisoprene phases (PI phases), with palladium nanoparticles hybridized to the PS phases, were obtained. The separate phases of Experiment 2-2 may be different from those of Experiment 2-1 because the separate phases of a lamellar structure can have a uniaxial lamellar structure or an onion-like structure.

(Experiment 2-3)

Polystyrene-coated gold nanoparticles (AuNP@PS) were mixed with two types of homopolymers (i.e., polystyrene (PS) and polyisoprene (PI)) in THF, water was added, and THF was then evaporated at room temperature to obtain microparticles. Microparticle structure was observed under a transmission electron microscope (TEM) (see FIG. 5).

(Result 2-3)

Figure 5:
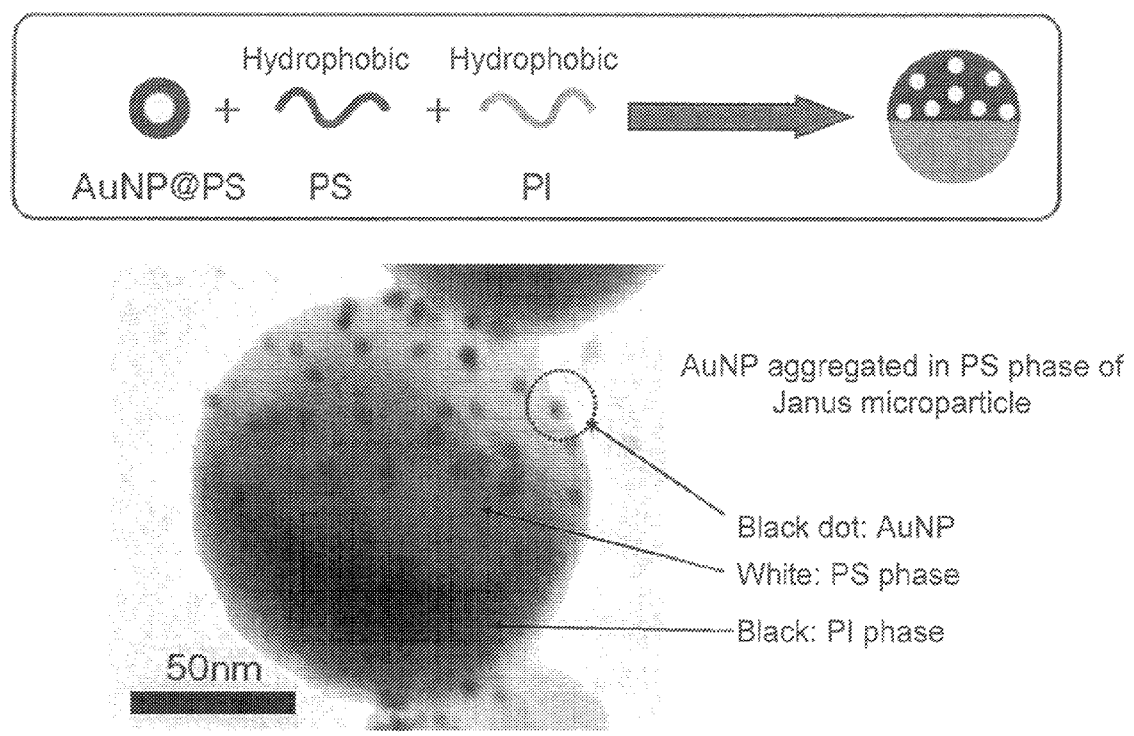
FIG. 5 is a photograph showing TEM observation of inorganic-organic hybrid particles having two hemispheres made of polystyrene-coated gold nanoparticles and a homopolymer of polystyrene and polyisoprene.

As shown in FIG. 5, inorganic-organic hybrid particles having a Janus structure composed of a hemisphere of a polystyrene phase (PS phase) and another hemisphere of a polyisoprene phase (PI phase) were obtained, and gold nanoparticles (AuNP) were hybridized to the PS phase.

(Experiment 2-4)

Polystyrene-coated gold nanoparticles (AuNP@PS), polyisoprene-coated gold nanoparticles of a size different from the former gold nanoparticles (AuNP@PI), and a block copolymer of polystyrene and polyisoprene (PS-b-PI) were mixed in THF, water was added, and THF was then evaporated at room temperature to obtain microparticles. Microparticle structure was observed under a transmission electron microscope (TEM) (see FIG. 6).

(Result 2-4)

Figure 6:
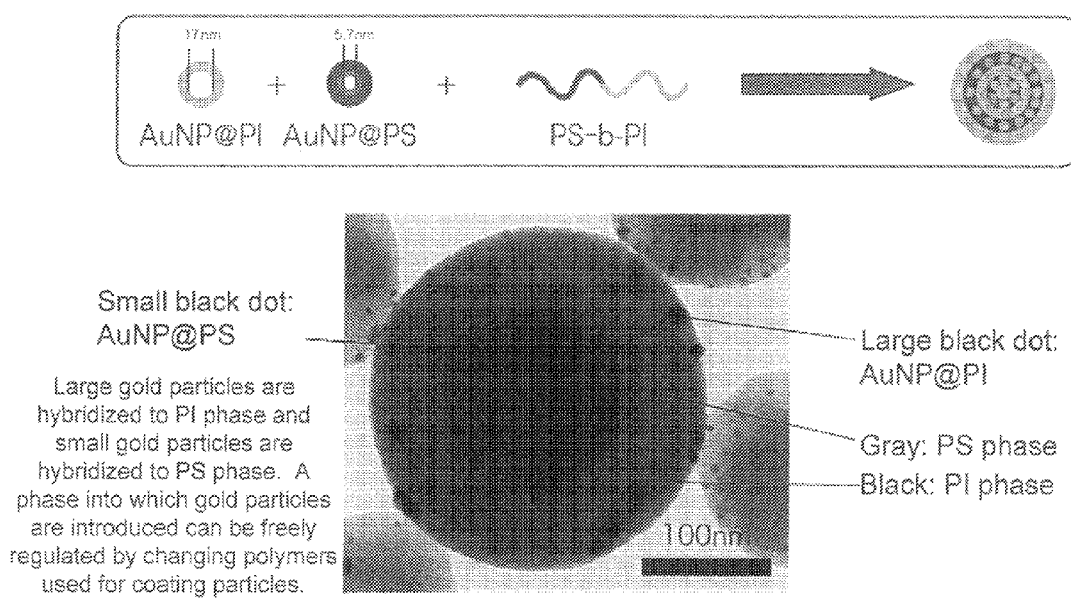
FIG. 6 is a photograph showing TEM observation of inorganic-organic hybrid particles having an onion-like structure made of polystyrene-coated gold nanoparticles, polyisoprene-coated gold nanoparticles, and a block copolymer of polystyrene and polyisoprene.

As shown in FIG. 6, microparticles having onion-like separate phases of polyisoprene phase (PI phase) and polystyrene phase (PS phase), with polyisoprene-coated gold nanoparticles (large black dots, AuNP@PI) and polystyrene-coated gold nanoparticles (small black dots, AuNP@PS) hybridized to the PI phase and the PS phase respectively, were obtained. The results indicate that a phase into which gold particles are introduced can be freely controlled by changing polymers used for coating particles.

(Experiment 2-5)

Polystyrene-coated palladium nanoparticles (PdNP@PS), polyisoprene-coated gold nanoparticles of a size different from the former palladium nanoparticles (AuNP@PI), and a block copolymer of polystyrene and polyisoprene (PS-b-PI) were mixed in THF, water was added, and THF was then evaporated at room temperature to obtain microparticles. Microparticle structure was observed under a transmission electron microscope (IBM) (see FIG. 7).

(Result 2-5)

Figure 7:
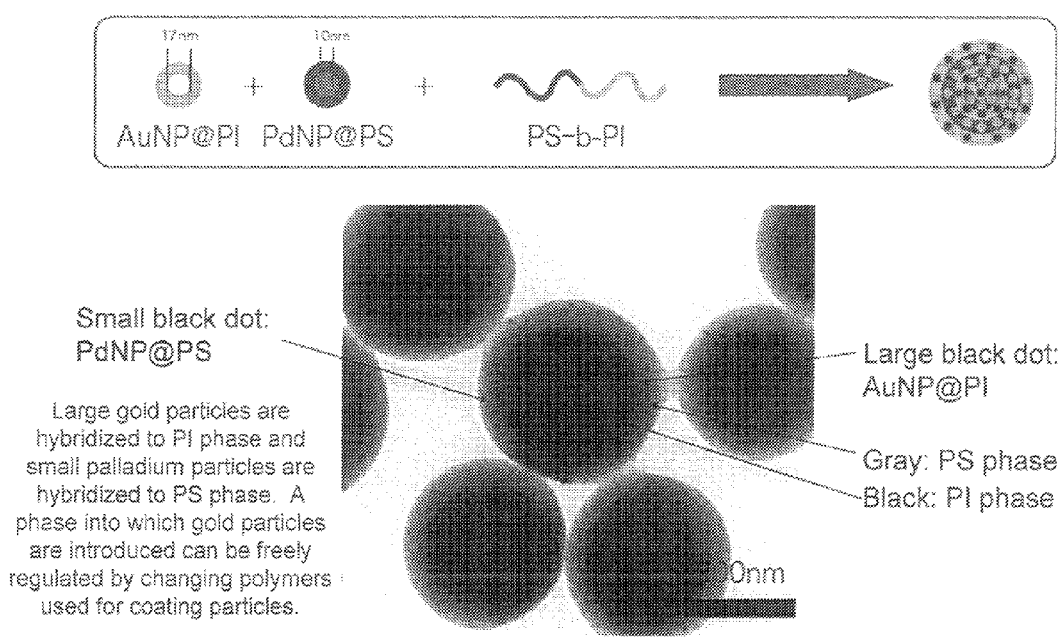
FIG. 7 is a photograph showing TEM observation of inorganic-organic hybrid particles having an onion-like structure made of polystyrene-coated palladium nanoparticles, polyisoprene-coated gold nanoparticles, and a block copolymer of polystyrene and polyisoprene.

As shown in FIG. 7, microparticles having onion-like separate phases of polyisoprene phases (PI phases) and polystyrene phases (PS phases), with polyisoprene-coated gold nanoparticles (large black dots, AuNP@PI) and polystyrene-coated palladium nanoparticles (small black dots, PdNP@PS) hybridized to the PI phases and the PS phases, respectively, were obtained. The results indicate that polymer particles having two types of metals in different phases can be produced by changing the polymer used for coating the particles and metal species.

Example 3

Optical Assay of Inorganic-Organic Hybrid Particles

Figure 8:
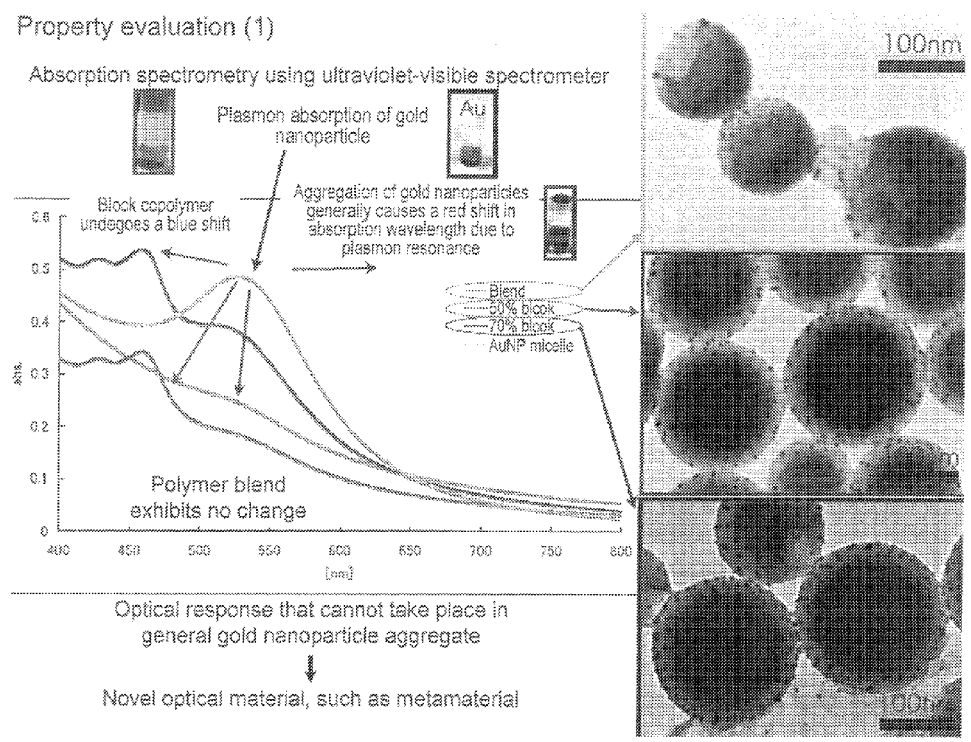
FIG. 8 shows the results of evaluation of optical properties of inorganic-organic hybrid particles made of polystyrene-coated gold nanoparticles and a block copolymer of polystyrene and polyisoprene.

In order to evaluate the optical properties of polymer particles, inorganic-organic hybrid particles which were produced from polystyrene-coated gold nanoparticles and a block copolymer of polystyrene and polyisoprene (percentage of nanoparticles mixed: 50% (red line) and 70% (black line)), polymer blend particles having a Janus structure to which polystyrene-coated gold nanoparticles had been hybridized (blue line), and polystyrene-coated gold nanoparticle micelles (green line) were subjected to visible absorption spectroscopy (see FIG. 8).

As shown in FIG. 8, surface-plasmon-derived absorption was observed at around 520 nm in gold nanoparticles alone. Such absorption was also observed in polymer blend particles. It is generally known that, when gold nanoparticles are adjacent to each other, plasmon between particles resonate with each other, and the absorber shifts toward the longer-wavelength side. This indicates that metal nanoparticles do not interact with each other within polymer blend particles.

When gold nanoparticles were allowed to hybridize to the block copolymer, the absorption band shifted towards a shorter wavelength side (blue shift), and the peak shifted to around 480 nm. Such optical response cannot take place in general plasmon resonance. This indicates that novel optical effects were attained as a result of periodic positioning of metal nanoparticles in microparticles.

Example 4

Figure 12:
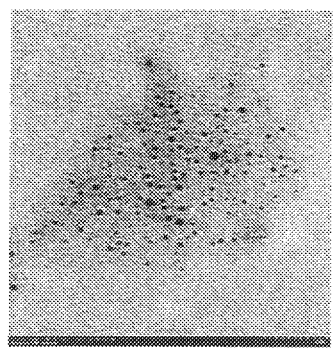
FIG. 12 shows a TEM image and a particle size histogram of gold nanoparticles.
Figure 12:
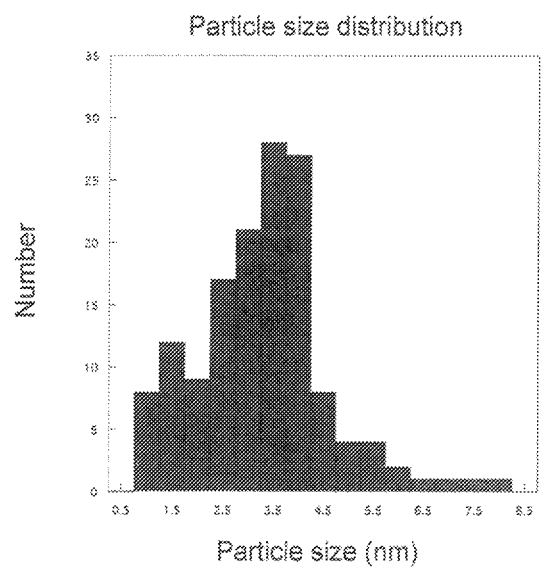

Composite Microparticles of Gold Nanoparticles Coated with Thiol-Terminated Polystyrene and Polymer (Experiment 4-1) Synthesis of Thiol-Terminated Polystyrene-Coated Gold Nanoparticles Gold nanoparticles were synthesized in accordance with the method of Brust et al. (Journal of Chemical Society, Chemical Communications, 1994, pp. 801-802). Chloroauric acid monohydrate (150 mg) was dissolved in Milli-Q water. Tetraoctylammonium bromide (187.75 mg) was dissolved in 40 ml of toluene. An aqueous chloroauric acid solution and the toluene solution mentioned above were added to a triangular flask, and the mixture was vigorously agitated with the use of a magnetic stirrer. Thiol-terminated polystyrene (PS-SH; number average molecular weight of PS: 1,000; 419.5 mg) was dissolved in 15 ml of toluene, and the resultant was added to the reaction solution. $NaBH_4$ (190 mg) was dissolved in 12 ml of Milli-Q water, and the resultant was slowly added to the reaction solution. The toluene phase that had become red was fractionated, it was concentrated with a rotary evaporator, and 100 ml of ethanol was added for precipitation. The resultant was cooled in a refrigerator at −18° C. for approximately 2 hours, and the precipitate was recovered via centrifugation. This procedure was repeated twice for purification. As a result of transmission electron microscopic (TEM) observation, the production of gold nanoparticles with particle sizes of 3.3±1.3 nm was confirmed. FIG. 12 shows a TEM image of gold nanoparticles and a particle size histogram of gold nanoparticles.

(Experiment 4-2) Formation of Composite with Block Copolymer

Figure 13:
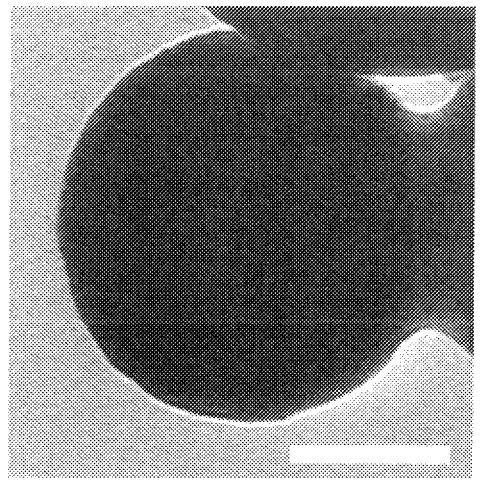
FIG. 13 shows a TEM image of gold nanoparticle-PS-b-PI composite microparticles.

The synthesized gold nanoparticles were dissolved in THF. A solution of polystyrene-block-polyisoprene (PS-b-PI Mn (PS)=118,000 g/mol; Mn (PI)=107,000 g/mol; Mn/Mw=1.07) in THF was prepared, and the resulting solution was mixed with a solution of gold nanoparticles. Water (2 ml) was added and THF was evaporated at 25° C. In order to observe the internal structure of the produced microparticles, the PI region was stained with $OsO_4$ and observed under TEM. As a result, production of microparticles comprising gold nanoparticles introduced therein and development of separate concentric phases were confirmed. FIG. 13 shows a TEM image of gold nanoparticle-PS-b-PI composite microparticles.

Example 5

Figure 14:
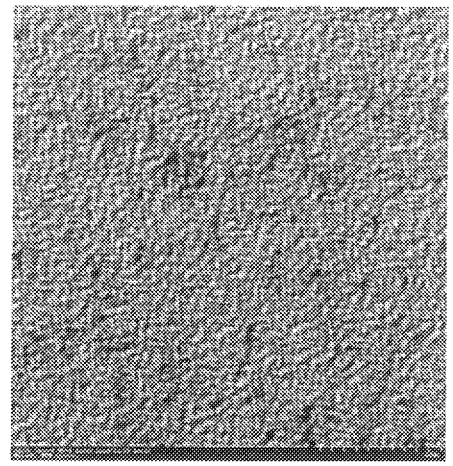
FIG. 14 shows a TEM image of synthesized CdS nanoparticles.

CdS Nanoparticle-Polymer Composite Microparticles (Experiment 5-1) Synthesis of CdS Nanoparticles Coated with Block Copolymer Polystyrene-block-poly(2-vinylpyridine) (PS-b-P2VP (Mn (PS)=17,500, Mn (P2VP)=9,500)) was dissolved in anhydrous toluene at 5 g/l, and the solution was agitated for 5 hours to form micelles. $Cd(OAc)_2$ was added, the resultant was agitated for 24 hours, $Na_2S$ and a minor amount of water were added, and the mixture was agitated for an additional 24 hours to produce CdS nanoparticles. The nanoparticles were recovered after centrifugation had been carried out at 3,000 rpm for 30 minutes. The size of the synthesized nanoparticles was found to be approximately 5 nm as a result of TEM observation. FIG. 14 shows a TEM image of the synthesized CdS nanoparticles.

Figure 15:
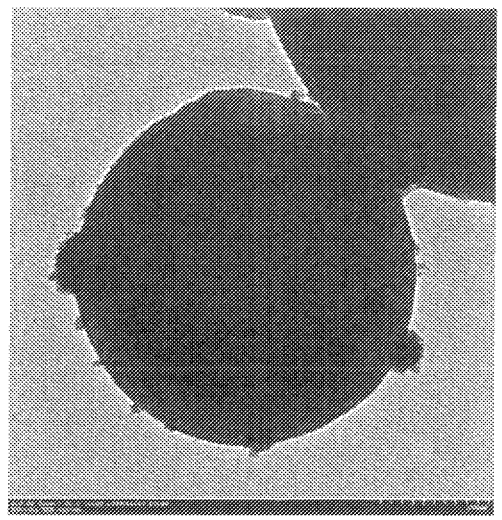
FIG. 15 shows a TEM image of a CdS nanoparticle-block copolymer composite.

(Experiment 5-2) Production of CdS Nanoparticle-Polymer Composite Microparticles A solution of the produced micelles and 0.1 g/l PS-b-PI (Mn(PS)=130,000; Mn(PI)=138,000) in tetrahydrofuran (THF) was prepared, the total amount thereof was adjusted to 1 ml, and water was added dropwise thereto at 1 ml/min with agitation. The solution was allowed to stand in an incubator at 25° C. for 2 days to evaporate THF, and the microparticle dispersion was then obtained. The PI regions of the produced microparticles were stained with an aqueous $OsO_4$ solution, and the internal structure was observed under TEM. As a result, separate concentrically developed phases and introduced nanoparticles were observed inside the microparticles. FIG. 15 shows a TEM image of the CdS nanoparticle-block copolymer-composite.

The invention claimed is:

1. A method for producing an inorganic-organic hybrid particle having a particle size of 10 nm to 100 μm, which comprises: (1) to a solution containing an organic material composed of two or more different components dissolved in a good solvent, adding a poor solvent of an organic material compatible with the good solvent, evaporating the good solvent, and obtaining an organic particle which has a structure where the organic material forms separate phases; (2) mixing the organic particle with a salt of at least one inorganic material capable of coordinating to at least one organic component to obtain an inorganic-ion-organic hybrid particle; and (3) reducing the inorganic-ion-organic hybrid particle to obtain an inorganic-organic hybrid particle.

2. The production method according to claim 1, wherein the inorganic material is microparticle having particle size of 0.5 nm to 100 nm.

3. The production method according to claim 1, wherein the inorganic material is metal, metal compound, or alloy.

4. The production method according to claim 1, wherein the organic material composed of two or more different components is composed of two or more different monopolymer components.

5. The production method according to claim 1, wherein the organic material composed of two or more different components is a block copolymer composed of two or more different organic materials.

* * * * *